United States Patent
Su (10) Patent No.: US 12,525,002 B1
(45) Date of Patent: Jan. 13, 2026

(54) AUTOMATED LITHOLOGY INSTANCE SEGMENTATION MODEL EVALUATION AND UPDATE

(71) Applicant: Schlumberger Technology Corporation, Sugar Land, TX (US)

(72) Inventor: Laura Su, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 19/203,298

(22) Filed: May 9, 2025

(30) Foreign Application Priority Data

Apr. 9, 2025 (EP) .................................... 25305515

(51) Int. Cl.
| | |
|---|---|
| *G06V 10/776* | (2022.01) |
| *E21B 49/00* | (2006.01) |
| *G06V 10/26* | (2022.01) |
| *G06V 10/772* | (2022.01) |
| *G06V 10/774* | (2022.01) |

(52) U.S. Cl.
CPC .......... *G06V 10/776* (2022.01); *E21B 49/005* (2013.01); *G06V 10/26* (2022.01); *G06V 10/772* (2022.01); *G06V 10/774* (2022.01); *E21B 2200/22* (2020.05)

(58) Field of Classification Search
CPC . E21B 2200/22; E21B 49/005; G06V 10/776; G06V 10/772; G06V 10/26
See application file for complete search history.

(56) References Cited

U.S. PATENT DOCUMENTS

| | | | |
|---|---|---|---|
| 12,154,324 B1* | 11/2024 | Marlot | G06V 10/26 |
| 12,307,642 B2* | 5/2025 | Sharma | E21B 49/005 |
| 2022/0136344 A1* | 5/2022 | Mora | G01V 8/00 |
| | | | 175/48 |
| 2023/0220770 A1* | 7/2023 | Yamada | G06T 7/40 |
| | | | 175/24 |
| 2023/0374903 A1* | 11/2023 | Al-Qubaisi | E21B 49/005 |
| 2024/0412107 A1* | 12/2024 | Alaas | E21B 41/00 |
| 2025/0027409 A1* | 1/2025 | Kherroubi | G06V 20/70 |
| 2025/0067173 A1* | 2/2025 | Rowe | G01N 35/00029 |
| 2025/0231393 A1* | 7/2025 | Ammar | H04N 1/6033 |

* cited by examiner

*Primary Examiner* — Shane Bomar
(74) *Attorney, Agent, or Firm* — Jeffrey D. Frantz (57) ABSTRACT

Aspects provide a method of automated lithology at a wellbore. The method includes imaging cuttings collected while drilling the wellbore. The method includes one or more processors: obtaining, from an instance segmentation machine learning model, one or more lithology predictions associated with the wellbore based on the images; determining one or more performance metric scores for the instance segmentation machine learning model based on the one or more lithology predictions and reference data; and comparing the one or more performance metrics scores to one or more performance metric score thresholds and/or one or more performance metrics scores of a second model. The method includes based on the comparison: labeling the images; and (i) retraining the model using the labeled images; or (ii) replacing the model with the second model. The method includes obtaining, from the retrained or second instance segmentation machine learning model, one or more second lithology predictions.

20 Claims, 7 Drawing Sheets

AUTOMATED LITHOLOGY INSTANCE SEGMENTATION MODEL EVALUATION AND UPDATE

INTRODUCTION

Field of the Disclosure

The present disclosure is related to machine learning operations and, more specifically, to monitoring, evaluating, deploying, and updating of machine learning models including an automated lithology instance segmentation machine learning model.

BACKGROUND

In recent years, machine learning (ML) and artificial intelligence (AI) are rapidly emerging and have the potential to transform various industries, offering solutions to complex problems and enabling automation in ways previously thought to be impossible. The rise of AI and ML is attributed to advances in computing power, the availability of large datasets, and the development of more sophisticated algorithms. These technologies are now central to fields as diverse as healthcare, finance, manufacturing, and energy.

AI and ML encompass a broad range of models and algorithms, each suited to different types of problems. Supervised learning models, such as decision trees, support vector machines (SVMs), and neural networks, rely on labeled data to make predictions or classifications. Unsupervised learning, such as clustering and anomaly detection algorithms, identifies patterns within unlabeled data, allowing for exploration and discovery of hidden structures. Reinforcement learning, which learns through trial and error, is particularly effective in scenarios where an agent interacts with an environment to maximize some form of reward. Additionally, deep learning, a subset of neural networks, has gained prominence for its ability to process complex and high-dimensional data, such as images, speech, and natural language. For example, large language models (LLMs), such as GPT (Generative Pre-trained Transformer) and BERT (Bidirectional Encoder Representations from Transformers), have emerged as powerful tools for understanding and generating human language. These models are trained using vast amounts of textual data and employ transformer architectures that allow for efficient processing of sequential data. LLMs typically leverage self-supervised learning during pretraining, making predictions about missing parts of text, and are fine-tuned for specific tasks using supervised methods. LLMs are transforming fields such as natural language processing (NLP), enabling advanced applications in text summarization, sentiment analysis, and conversational AI. These AI and ML models may be implemented in various algorithms. Each of these models and algorithms has its own set of strengths and limitations, making it critical to select the appropriate approach for each specific application.

The oil and gas industry is a major global sector that has historically relied on traditional engineering, geological, and geophysical methods to extract and manage resources. However, as the demand for energy continues to grow and as companies face increasing pressure to optimize operations and reduce costs, there is an emerging need for more advanced technological solutions. AI and ML have the potential to revolutionize this industry by providing better predictive capabilities, automation, and optimization of complex processes. For example, AI and ML can enhance exploration and drilling operations by analyzing seismic data to identify promising drilling locations more efficiently than traditional methods. Machine learning models can be applied to predictive maintenance, monitoring equipment health and predicting failures before they occur, which reduces downtime and lowers operational costs. In reservoir management, AI-driven models can optimize production by analyzing real-time data to improve the accuracy of simulations, better forecasting of oil and gas production, and more effective reservoir management strategies. Furthermore, the integration of AI and ML into supply chain management can streamline logistics, optimize resource allocation, and reduce waste, leading to cost savings and a more sustainable operation.

Despite the promise of these technologies, there remain significant challenges, such as the need for high-quality data, the complexity of integrating AI models into existing infrastructure, and the interpretability of AI/ML models, which is critical for decision-making in safety-critical environments like oil and gas operations.

As AI/ML models are deployed in production, these models may encounter performance degradation when faced with new, unseen data. Performance degradation may refer to a decline in the model's effectiveness in making accurate predictions or classifications as the model encounters data that differs from the data it was trained on.

There is, therefore, a need for improved methods and systems that can effectively apply AI/ML to optimize various aspects of oil and gas exploration, production, and management.

SUMMARY

The technology described herein provides for automated lithology instance segmentation machine learning model evaluation and update.

Aspects provide a method of automated lithology at a wellbore. The method includes drilling the wellbore. The method includes collecting cuttings produced by the drilling of the wellbore. The method includes imaging the cuttings. The method includes providing images of the cuttings to a trained instance segmentation machine learning model. The method includes obtaining, at one or more processors, from the instance segmentation machine learning model, one or more lithology predictions associated with the wellbore. The method includes determining, by the one or more processors, one or more performance metric scores for the instance segmentation machine learning model based on the one or more lithology predictions and reference data. The method includes comparing, by the one or more processors, the one or more performance metrics scores for the instance segmentation machine learning model to at least one of: one or more performance metric score thresholds or one or more performance metrics scores of a second instance segmentation machine learning model. The method includes, based on the comparison, labeling the images; and (i) retraining the instance segmentation machine learning model using the labeled images as training data; or (ii) replacing the instance segmentation machine learning model with the second instance segmentation machine learning model. The method includes obtaining, from the retrained instance segmentation machine learning model or from the second instance segmentation machine learning model, one or more second lithology predictions associated with the wellbore.

Aspects provide a non-transitory computer readable medium. The non-transitory computer readable medium includes computer executable code for automated lithology at a wellbore. The computer executable code includes code for inputting images of drilling cuttings from a wellbore to a trained instance segmentation machine learning model. The computer executable code includes code for obtaining outputting from the instance segmentation machine learning model, one or more lithology predictions associated with the wellbore. The computer executable code includes code for determining one or more performance metric scores for the instance segmentation machine learning model based on the one or more lithology predictions and reference data. The computer executable code includes code for comparing the one or more performance metrics scores for the instance segmentation machine learning model to at least one of: one or more performance metric score thresholds or one or more performance metrics scores of a second instance segmentation machine learning model. The computer executable code includes code for, based on the comparison: labeling the images; and (i) retraining the instance segmentation machine learning model using the labeled images as training data; or (ii) replacing the instance segmentation machine learning model with the second instance segmentation machine learning model. The computer executable code includes code for obtaining, from the retrained instance segmentation machine learning model or from the second instance segmentation machine learning model, one or more second lithology predictions associated with the wellbore.

Aspects provide a system for automated lithology at a wellbore. The system includes a camera configured to image cuttings collected during drilling of the wellbore. The system includes a trained instance segmentation machine learning model. The instance segmentation machine learning model is configured to obtain the images of the cuttings. The instance segmentation machine learning model is configured to output one or more lithology predictions associated with the wellbore based on the images. The system includes one or more processors. The one or more processors are configured to determine one or more performance metric scores for the instance segmentation machine learning model based on the one or more lithology predictions and reference data. The one or more processors are configured to compare the one or more performance metrics scores for the instance segmentation machine learning model to at least one of: one or more performance metric score thresholds or one or more performance metrics scores of a second instance segmentation machine learning model. The one or more processors are configured to, based on the comparison: label the images; and (i) retrain the instance segmentation machine learning model using the labeled images as training data; or (ii) replace the instance segmentation machine learning model with the second instance segmentation machine learning model. The one or more processors are configured to obtain, from the retrained instance segmentation machine learning model or from the second instance segmentation machine learning model, one or more second lithology predictions associated with the wellbore.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

The present disclosure provides approaches for maintaining, monitoring, evaluating, and updating machine learning models, such as an instance segmentation ML model for automated lithology of a wellbore.

In some aspects, the approaches provide for evaluating the performance of the model for new data and comparing the performance of the model to the performance using old (or known) data and/or for comparing the performance of the model to a new model. In some aspects, the evaluation can be used to retrain the model and determine whether the newly trained model outperforms the previous model.

In some aspects, the approaches provide for evaluating the performance of the model for both the case where ground truth information is available to evaluate the model and for the case where ground truth information is not available. In some aspects, other metrics can be used to evaluate the model in the case that ground truth is not available, such as by comparing the number of segments and/or the surface coverage of segments predicted by the instance segmentation ML model to a threshold and/or to the number or surface coverage of segmented predicted by another instance segmentation ML model. In some aspects, both ground truth metrics and the other metrics can be used to evaluate the model.

In some aspects, approaches are provided for providing a user interface for visualization of the performance of the ML model. In some aspects, the user interface also accepts input from the user, for example, to adjust parameters of the ML model, to select a new ML model, and/or to adjust drilling parameters based on the model performance.

In the following description, numerous details are set forth to provide an understanding of some embodiments of the present disclosure. It is to be understood that the following disclosure provides many different aspects, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described aspects are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Example Drilling System

Oil and gas drilling is a complex process involving the penetration of subsurface formations to extract hydrocarbons from reservoirs. The process is typically carried out using a drilling rig that creates a wellbore, through which the hydrocarbons can be brought to the surface. To optimize drilling operations and ensure the accurate identification of hydrocarbon-bearing formations, continuous monitoring and evaluation of the subsurface geology are essential.

Figure 1:
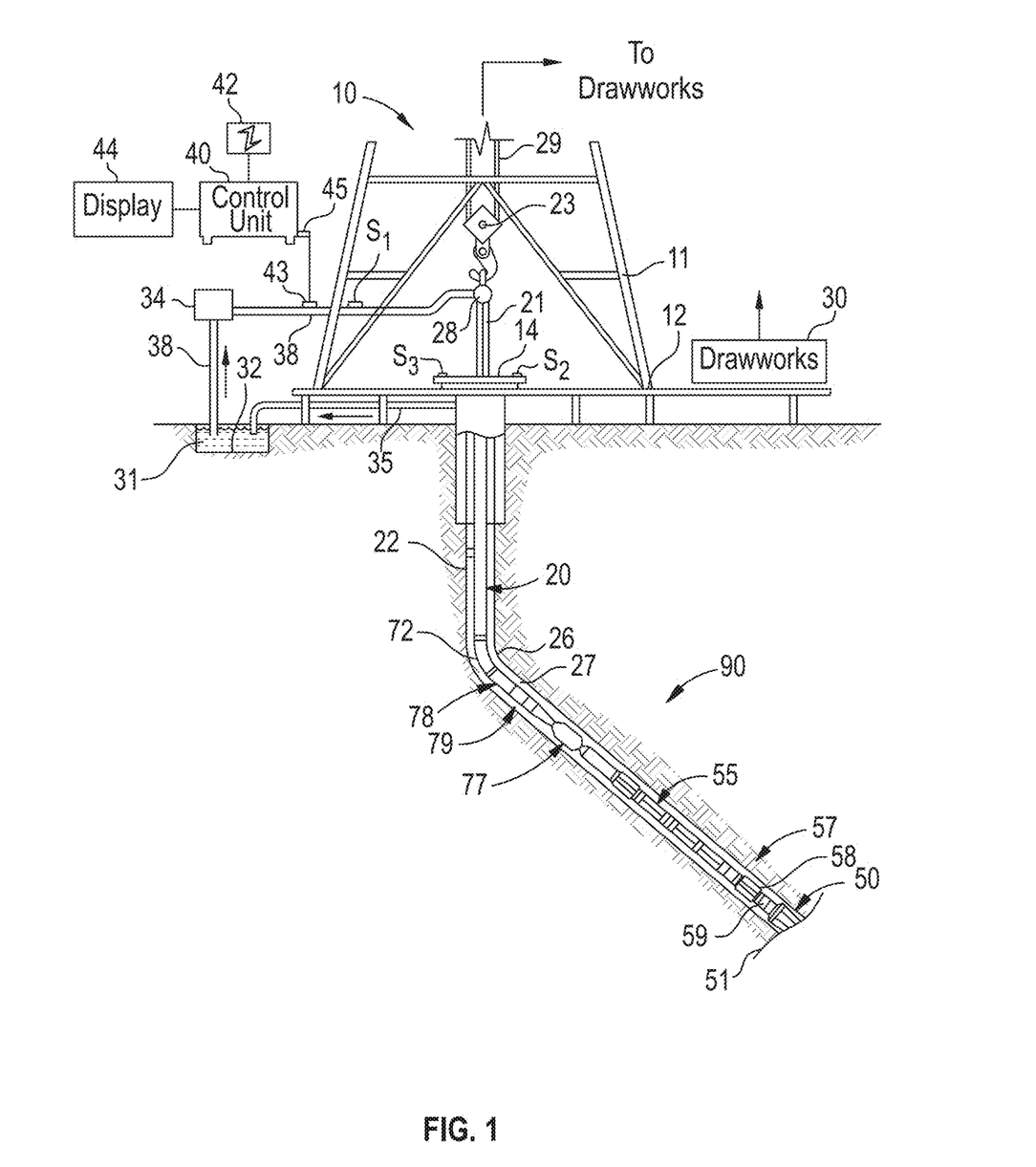
FIG. 1 depicts an example drilling system, according to one or more aspects.

FIG. 1 depicts an example drilling system 10 in which automated lithology may be performed according to certain aspects. It should be understood that FIG. 1 merely depicts an example drilling system, and that the automated lithology techniques described herein may be performed in any drilling system.

FIG. 1 shows a schematic diagram of a drilling system 10 with a drill string 20 carrying a drilling assembly 90, also referred to as the bottomhole assembly (BHA), conveyed in a "wellbore" or "borehole" 26 for drilling the borehole. A drilling rig suspends a conduit called the drill string 20 within a wellbore 26 being drilled through subsurface formations. The drill string 20 may be assembled by threadedly coupling together end to end a number of segments ("joints") of drill pipe. The end of the drill string 20 includes a drill bit 50 at its lower end.

The drilling system 10 depicts a conventional derrick 11 erected on a floor 12 which supports a rotary table 14 that is rotated by a prime mover such as an electric motor (not shown) at a desired rotational speed. The drill string 20 includes tubing such as a drill pipe 22 or a coiled-tubing extending downward from the surface into the borehole 26. The drill string 20 is pushed into the borehole 26 when a drill pipe 22 is used as the tubing. For coiled-tubing applications, a tubing injector, such as an injector (not shown), however, is used to move the tubing from a source thereof, such as a reel (not shown), to the borehole 26. The drill bit 50 attached to the end of the drill string 20 breaks up the geological formations when it is rotated to drill the borehole 26. If a drill pipe 22 is used, the drill string 20 is coupled to a drawworks 30 via a kelly joint 21, swivel 28, and line 29 through a pulley 23. During drilling operations, the drawworks 30 is operated to control the weight on bit, which is an important parameter that affects the rate of penetration.

During drilling operations, a suitable drilling fluid 31 from a mud pit (source) 32 is circulated under pressure through a channel in the drill string 20 by a mud pump 34 (or slush pump). The drilling fluid passes from the mud pump 34 into the drill string 20 via a desurger (not shown), fluid line 38, and kelly joint 21.

The drilling fluid 31 is discharged at the borehole bottom 51 through an opening in the drill bit 50. The drilling fluid 31 circulates uphole through the annular space 27 between the drill string 20 and the borehole 26 and returns to the mud pit 32 via a return line 35. In some aspects, a shale shaker separates the cuttings from the drilling mud to allow the mud to be reused. The drilling fluid acts to lubricate the drill bit 50 and to carry borehole cutting or chips away from the drill bit 50. In some aspects, the system includes one or more mud tanks configured to hold the drilling fluid after its cleaned by the shale shaker.

In some aspects, measurement instruments (e.g., MWD and LWD instruments) may be disposed in thick-walled segments of pipe called drill collars, and such collars are disposed proximate the lower end of the drill string 20. A sensor $S_1$ placed in the fluid line 38 can provide information about the fluid flow rate. A surface torque sensor $S_2$ and a sensor $S_3$ associated with the drill string 20, respectively, provide information about the torque and rotational speed of the drill string. Additionally, a sensor (not shown) associated with line 29 is used to provide the hook load of the drill string 20.

The drill bit 50 can be rotated by only rotating the drill pipe 22. Alternatively, a downhole motor 55 (mud motor) disposed in the drilling assembly 90 can rotate the drill bit 50 and the drill pipe 22 is rotated usually to supplement the rotational power and to effect changes in the drilling direction. The mud motor 55 may be coupled to the drill bit 50 via a drive shaft (not shown) disposed in a bearing assembly 57. The mud motor 55 rotates the drill bit 50 when the drilling fluid 31 passes through the mud motor 55 under pressure. The bearing assembly 57 supports the radial and axial forces of the drill bit 50. A stabilizer 58 coupled to the bearing assembly 57 acts as a centralizer for the lowermost portion of the mud motor 55 assembly.

A drilling sensor module 59 may be placed near the drill bit 50. The drilling sensor module 9 may contain sensors, circuitry, and processing software and algorithms relating to the dynamic drilling parameters. Such parameters can include bit bounce, stick-slip of the drilling assembly 90, backward rotation, torque, shocks, borehole and annulus pressure, acceleration measurements, and other measurements of the drill bit condition. A suitable telemetry or communication subsystem 77 using, for example, two-way telemetry, is also provided as illustrated in the drilling assembly 90. The drilling sensor module 59 processes the sensor information and transmits it to the surface control unit 40 via the telemetry system 77. In some aspects, the telemetry may be a mud pulse telemetry system. As discussed in more detail herein, RFID telemetry may be used in addition to, or alternatively to, the telemetry system 77.

The telemetry system 77, a power unit 78 and a well logging instrument 79 are all connected in tandem with the drill string 20. In some aspects, the well logging instrument 79 is a MWD drilling instrument, a LWD drilling instrument, or other well logging instrument. Flex subs may be used in connecting the well logging instrument 79 in the drilling assembly 90. Such subs and tools may form the bottom hole drilling assembly 90 between the drill string 20 and the drill bit 50.

The drilling assembly 90 may include several instruments. These instruments may be any tool or device capable of operation in a wellbore 26. For example, some instruments measure a characteristic of the drill string 20, the wellbore 26 or the formations. The drilling assembly 90 may make various measurements while the borehole 26 is being drilled. The telemetry system 77 obtains the signals and measurements and transfers the signals, using two-way telemetry, for example, to be processed on the surface. Alternatively, the signals can be communicated to and processed using a downhole processor at a suitable location (not shown) in the drilling assembly 90.

The surface control unit 40 or processor may also receive one or more signals from other downhole sensors and devices and signals from sensors $S_1$-$S_3$ and other sensors used in the drilling system 10 and processes such signals according to programmed instructions provided to the surface control unit 40. The surface control unit 40 may display desired drilling parameters and other information on a display/monitor 44 utilized by an operator to control the drilling operations. The surface control unit 40 can include a computer or a microprocessor-based processing system, memory for storing programs or models and data, a recorder for recording data, and other peripherals. The control unit 40 can be adapted to activate alarms 42 when certain unsafe or undesirable operating conditions occur.

As discussed in more detail herein, the drilling system 10 may include an instance segmentation automated lithology M L/AI model.

Example Automated Lithology

As discussed with reference to the example drilling system depicted in FIG. 1, during drilling, the drill bit 50 attached to a drill string 20 is used to bore through rock formations. As the drill bit 50 penetrates the earth, it generates small rock fragments known as drilling cuttings. These cuttings are carried to the surface by a circulating drilling fluid, commonly referred to as "mud." The cuttings represent the lithology of the formation being drilled and provide critical insights into subsurface conditions.

Lithology is the study of the physical characteristics of rocks, including their mineral composition, texture, porosity, and permeability. Lithology plays a critical role in industries such as oil and gas exploration, mining, and construction, where an accurate understanding of subsurface geology is necessary for informed decision-making. Lithological identification of drilling cuttings can be done to determine the composition of the rock layers encountered during drilling. Further, detection of hydrocarbons in drilling cuttings can be used to identify formations that may contain oil or gas. In addition, understanding the physical characteristics of the rock, such as porosity and permeability, can be used to assess the integrity of the well. Drilling of the well, such as bit selection and weight-on-bit (WOB), may be optimized based on the hardness and abrasiveness of the formations encountered.

Lithology may involve retrieving cuttings samples from the field and cleaning the cuttings. Pictures of the cuttings are taken, and a geological description is made from the pictures. Traditionally, lithological analysis has been performed manually at the surface by geologists. This process involves the collection of samples from the mud return flow, washing and drying the samples, and examining them under a microscope, often requiring the visual inspection of rock samples or core data, in combination with laboratory measurements and well logs. Chemical analyses such as fluorescence or gas chromatography may also be performed to detect the presence of hydrocarbons. This process is time-intensive, subjective, and dependent on the expertise and experience of the individual geologist, leading to potential variability in results.

Recent advances in well logging technologies, including gamma ray, resistivity, density, and sonic logs, have significantly enhanced the availability of subsurface data. These tools provide valuable information regarding formation properties, but interpreting this data to identify lithology still requires significant manual intervention. Moreover, the sheer volume of data generated in modern drilling operations, combined with the complexity of integrating multiple datasets, has made manual analysis increasingly challenging and inefficient.

Recent advancements in automation and sensor technologies have introduced opportunities to enhance the efficiency and accuracy of cuttings analysis. Automated lithology systems can integrate imaging, spectroscopy, and machine learning algorithms to analyze cuttings in real-time, providing near-instantaneous lithological and hydrocarbon data. These technologies reduce human error and facilitate better decision-making during drilling operations.

Automated lithology systems may utilize machine learning algorithms, neural networks, and pattern recognition techniques, to analyze and classify subsurface formations based on geophysical data. These systems can process vast amounts of data quickly, identify subtle patterns or anomalies, and provide consistent and repeatable results. By reducing reliance on manual interpretation, automated lithology offers the potential to improve the accuracy, speed, and reliability of lithological analysis.

Object-Based Image Analysis (OBIA)

Automated lithology may use ML/AI models to perform Object Based Image Analysis (OBIA). For example, such models may analyze images of cuttings to predict lithology information. OBIA may analyze images at the object level rather than at the pixel level. Pixel-based image analysis often fails to capture the spatial and contextual relationships inherent in high-resolution imagery.

A first step in OBIA involves segmenting an image into meaningful objects or regions. This segmentation process groups neighboring pixels based on similarities in spectral, spatial, and texture properties. OBIA enables the segmentation of geological features from high-resolution images of cuttings or outcrops into distinct lithological units. This segmentation enhances the ability to differentiate between various rock types based on their visual characteristics.

Once segmented, these objects are classified using various algorithms that consider their attributes, such as shape, size, and context. By leveraging spatial and contextual information, OBIA enhances the accuracy of lithological discrimination and mapping. The AI/ML models can be trained on segmented objects to improve classification outcomes based on large datasets.

OBIA with Instance Segmentation

OBIA may struggle with distinguishing between similar-looking rock types or dealing with overlapping features. Instance segmentation addresses these challenges by providing clear delineation between different instances, thus improving classification accuracy. Instance segmentation allows geologists to analyze images with greater precision by providing detailed outlines of different lithological units. This is particularly beneficial when dealing with complex geological formations where multiple rock types may be present in close proximity.

Figure 2A:
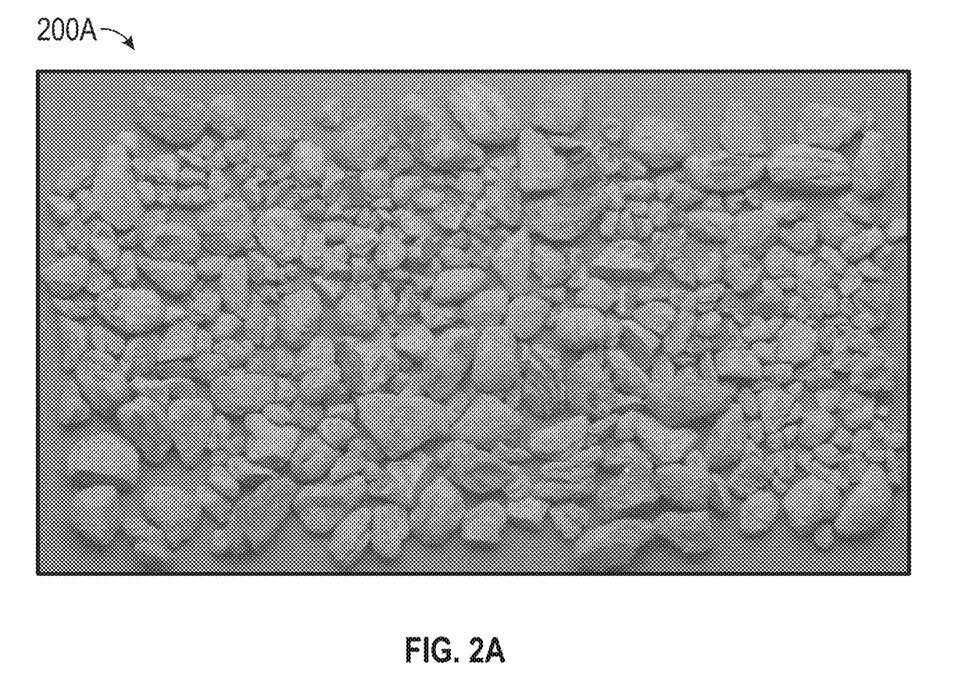
FIG. 2A depicts an example image of drilling cuttings input to an instance segmentation model, according to one or more aspects.
Figure 2B:
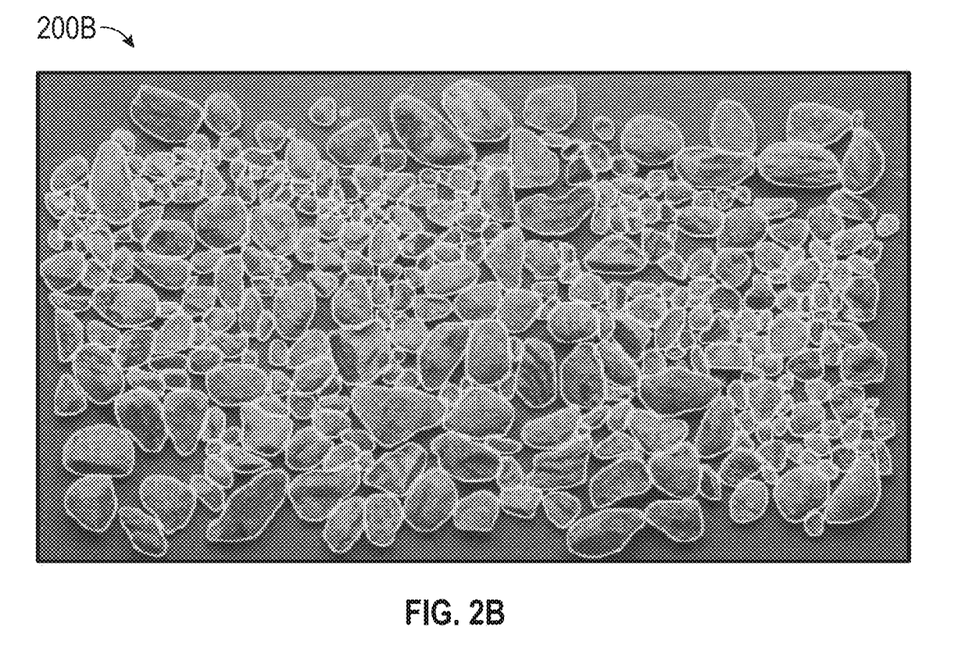
FIG. 2B depicts an example of instance segmentation output by the instance segmentation model for the input image of FIG. 2A, according to one or more aspects.

Instance segmentation is a sophisticated computer vision task that not only identifies objects within an image but also delineates each object instance with pixel-level precision. This technique is crucial for applications where understanding the shape and boundaries of objects is essential. Unlike traditional object detection that provides bounding boxes around objects, instance segmentation assigns a unique label to each pixel corresponding to the object it belongs to. This allows for a more detailed understanding of the scene. Instance segmentation can differentiate between multiple instances of the same class within an image. For example, it can distinguish between different trees in a forest or various rock types in geological images. FIG. 2A depicts an example image 200A of drilling cuttings input to an instance segmentation model, according to one or more aspects. FIG. 2B depicts an example of instance segmentation output 200B by the instance segmentation model for the input image 200A of FIG. 2A, according to one or more aspects.

Machine learning models can be trained on segmented images to automate lithological classification. One approach for instance segmentation is mask region-based convolutional neural network (Mask-R-CNN)—a detection-based approach that first identified objects and then refines the boundaries. Mask-R-CNN enhances traditional object detection by adding a branch for predicting segmentation masks on each detected object, allowing for pixel-level delineation of instances. A Mask-R-CNN may include a backbone network for feature extraction, followed by a Region Proposal Network (RPN) that generates proposals for potential object locations. The additional "mask head" generates binary masks for each detected object, enabling fine-grained segmentation. Region of interest (ROI) align improves the alignment of features by using bilinear interpolation. This enhancement is particularly beneficial for accurately segmenting small objects.

A single-shot approach for instance segmentation is a You Only Look at Coefficients (YOLACT) model, which performs detection and segmentation in a single pass for efficiency. A YOLACT model may be used for real-time instance segmentation. A YOLACT model may divide the instance segmentation process into two parallel tasks: generating a set of prototype masks over the entire image; and predicting coefficients for each instance. This separation simplifies the overall workflow and enhances speed.

Transformer-based approaches, like DEtection TRansformer (DETR), leverage transforms to understand relationships between pixels for improved segmentation accuracy. Transform-based models may simplify the detection pipeline by removing the need for anchor boxes and specialized libraries. A DETR model may employ a convolutional backbone followed by an encoder-decoder transformer structure that processes the entire image context simultaneously. This enables it to reason about object relationships effectively. The model may use a set-based global loss function that encourages unique predictions through bipartite matching, ensuring that each predicted object corresponds to one unique ground truth object.

Despite these advancements, existing automated lithology systems face several challenges. One significant challenge lies in the integration of diverse datasets from different logging tools, which may have varying resolutions, units, and data formats. The accuracy of machine learning models heavily depend on the quality and representativeness of the training data. Models may fail to generalize effectively to formations with limited historical data, leading to inaccurate predictions in new environments. Furthermore, these systems often lack adaptability, requiring extensive reconfiguration or retraining when applied to different geological basins or well types. Thus, as ML models are deployed in production, they may encounter performance degradation when faced with new, unseen data.

Example Monitoring, Evaluation, and Update of Automated Lithology Instance Segmentation Model According to certain aspects, an AI/ML model may be continuously monitored to evaluate the performance of the AI/ML model. Based on the evaluation, the AI/ML model may be updated, retrained, or replaced with a different model.

According to certain aspects, a dashboard may be provided to a user to view the results of the evaluation, compare the performance of the AI/ML model to another AI/ML model, and/or to input selections regarding decisions and/or parameters for the updating, retraining, and/or replacement of the AI/ML model. According to certain aspects, the dashboard may provide predictions by the AI/ML model, for example, such as lithology information based on the automated lithology using an AI/ML instance segmentation model. In some aspects, the lithology information may be depicted graphically to the user via the dashboard. In some aspects, the dashboard may provide a user interface for the user to make one or more drilling decisions based on the lithology information, such as a weight-on-bit selection, a bit type selection, a drilling rate selection, drilling parameters, and/or other decisions for drilling the well. In some aspects, the dashboard may allowed particular lithology images to be selected, flagged, and/or annotated to provide segmentation information. For example, such information may allow a user to supplement the AI/ML model automated lithology and/or for the user to provide feedback for the AI/ML model.

According to certain aspects, an automated system may analyze the results of the evaluation, compare the performance of the AI/ML model to another AI/ML model, and/or make determinations for the updating, retraining, and/or replacement of the AI/ML model.

In some aspects, the drilling cutting images are segmented and classified. For example, the images may be segmented into objects based on spectral properties (e.g., colors and intensities of pixels), spatial properties (e.g., shape, size, and position), and/or textural properties. In some aspects, multi-resolution segmentation, watershed segmentation, edge-based segmentation, and/or region-growing approaches may be used. Based on the segmentation, features can be extracted. For example, color metrics (e.g., mean, variance, RBG or grayscale values), texture metrics (e.g., co-occurrence matrices, entropy, wavelet transforms, smoothness, roughness), shape metrics (e.g., compactness, roundness, elongation), and/or size metrics (e.g., area, perimeter, aspect ratio) can be extracted from the segments. Based on the features, the segments may be classified. For example, a lithology class (e.g., sandstone, shale, limestone, etc.) may be assigned to each object using an AI/ML algorithm (e.g., random forest, support vector machine (SVM), neural network). The objects may be labeled (for supervised classification) or clustered (for unsupervised classification). Spatial filter may be applied to improve the coherence of classified regions. Results of the classification can be compared with ground truth data or manual classifications. Parameters of the models may be adjusted and the models retrained based on the comparison of the predictions to the ground truth.

Figure 3:
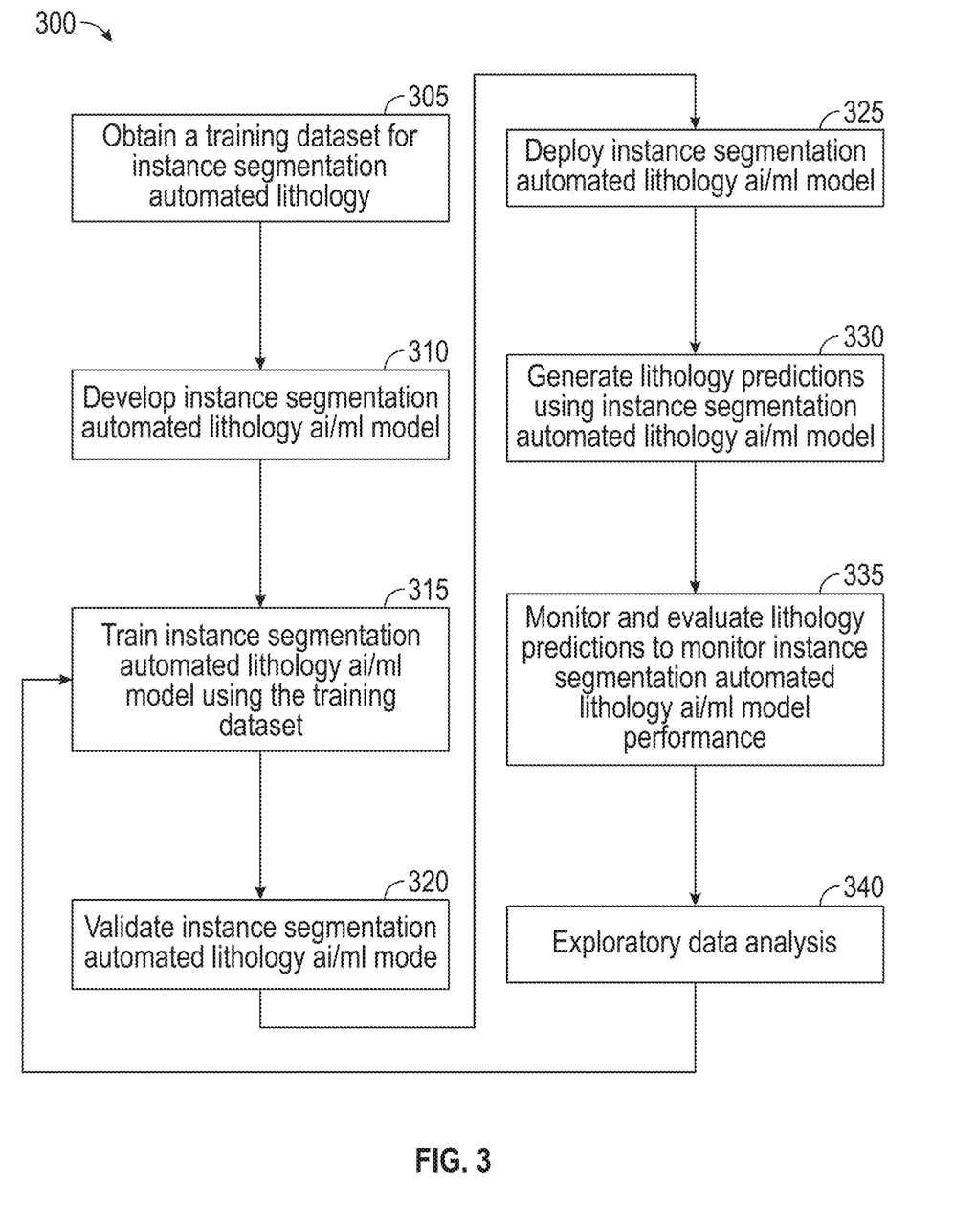
FIG. 3 depicts an example workflow for monitoring, evaluating, and updating instance segmentation automated lithology AI/ML models, according to one or more aspects.

FIG. 3 depicts an example workflow 300 for monitoring, evaluating, and updating instance segmentation automated lithology AI/ML models, according to one or more aspects. As shown, the workflow 300 may include obtaining a training dataset at operation 305. Obtaining a training dataset may include using a pre-generated training dataset or generating a training dataset.

In some aspects, generating the training dataset for the instance segmentation automated lithology AI/ML model at operation 305 may include image collection. For example, high-resolution images of geological cuttings may be collected. This can include photographs taken in the field or from laboratory samples. The image collection may include ensuring a diverse range of lithology is represented in the images, including different rock types, colors, textures, and conditions (e.g., wet vs. dry).

In some aspects, generating the training dataset for the instance segmentation automated lithology AI/ML model at operation 305 may include pre-processing the images. For example, the images may be resized to a consistent resolution suitable for model input (e.g., 640×640 pixels). The pre-processing may include normalizing the pixel values of the images. In some aspects, the pre-processing may include processing the images to ensure a consistent lighting and scale.

In some aspects, generating the training dataset for the instance segmentation automated lithology AI/ML model at operation 305 may include data augmentation. For example, data augmentation may be performed to increase dataset variability and robustness. Data augmentation may include rotation, flipping, scaling, and color adjustments.

Generating the training dataset for the instance segmentation automated lithology AI/ML model at operation 305 may include annotating the collected images. For instance segmentation, each object (lithological unit) in the images are annotated with a unique segmentation mask. Each segmentation mask may have a minimum of three points to form a valid polygon. Some example annotation include COCO and YOLO (You Only Look Once). Using COCO, the following format may be used to provide a list of coordinates defining the polygon that outlines the object for each annotated instance:

```
json
{
  "id": <instance_id>,
  "image_id": <image_id>,
  "category_id": <class_id>,
  "bbox": [<x>, <y>, <width>, <height>],
```

-continued

```
  "area": <area>,
  "segmentation": [[<x1>, <y1>, <x2>, <y2>, ..., <xn>, <yn>]],
  "iscrowd": 0
}
```

Using YOLO, the format consists of a text file per image with lines formatted as follows:

```
text
<class-index> <x1> <y1> <x2> <y2> ... < xn> <yn>
``` where each line corresponds to an object instance with normalized coordinates.

As shown, the workflow 300 may include developing an instance segmentation automated lithology AI/ML model at operation 310. After selecting a model (e.g., Mask-R-CNN, YOLACT, DETR, or other instance segmentation model), the hyperparameters may be such for the model, such as the learning rate, batch size, and number of epochs.

As shown, the workflow 300 may include training the instance segmentation automated lithology AI/ML model using the training dataset at operation 315. The instance segmentation automated lithology AI/ML model is trained using the annotated with the selected hyperparameters. In some aspects, the model is trained through validation, at operations 320, of performance metrics such as mean Average Precision (mAP) and/or Intersection over Union (IoU).

As shown, the workflow 300 may include deploying the instance segmentation automated lithology AI/ML model at operation 325. After deploying the instance segmentation automated lithology AI/ML model, the model is used make lithology predications at operation 330.

As shown, the workflow 300 may include evaluating the instance segmentation automated lithology AI/ML model at operation 335 to monitor the performance of the instance segmentation automated lithology AI/ML model.

As shown, the workflow 300 may include exploratory data analysis at operation 340 based on the evaluation of the instance segmentation automated lithology AI/ML model. Exploratory Data Analysis (EDA) is a data analysis process that analyzes the underlying structure of a dataset. EDA may involve visualizing and summarizing data to uncover patterns, spot trends, identify correlations, and/or identify outliers and anomalies in the data, and to generate insights that inform subsequent analysis. For example, EDA may use statistics, histograms, box plots, scatter plots, heat maps, pair plots, and/or multivariate analysis to visualize and analyze the data. The EDA analysis may assist in performing cleaning of the training data, for example, in identifying missing values, inconsistencies, and duplicates within the dataset. Conducting EDA on model predictions can reveal insights into the distribution of predicted classes versus actual classes, identification of any systematic errors or biases in model predictions, exploration of relationships between input features and model performance, and/or assessment of how well the model generalizes across different lithological categories.

Figure 4:
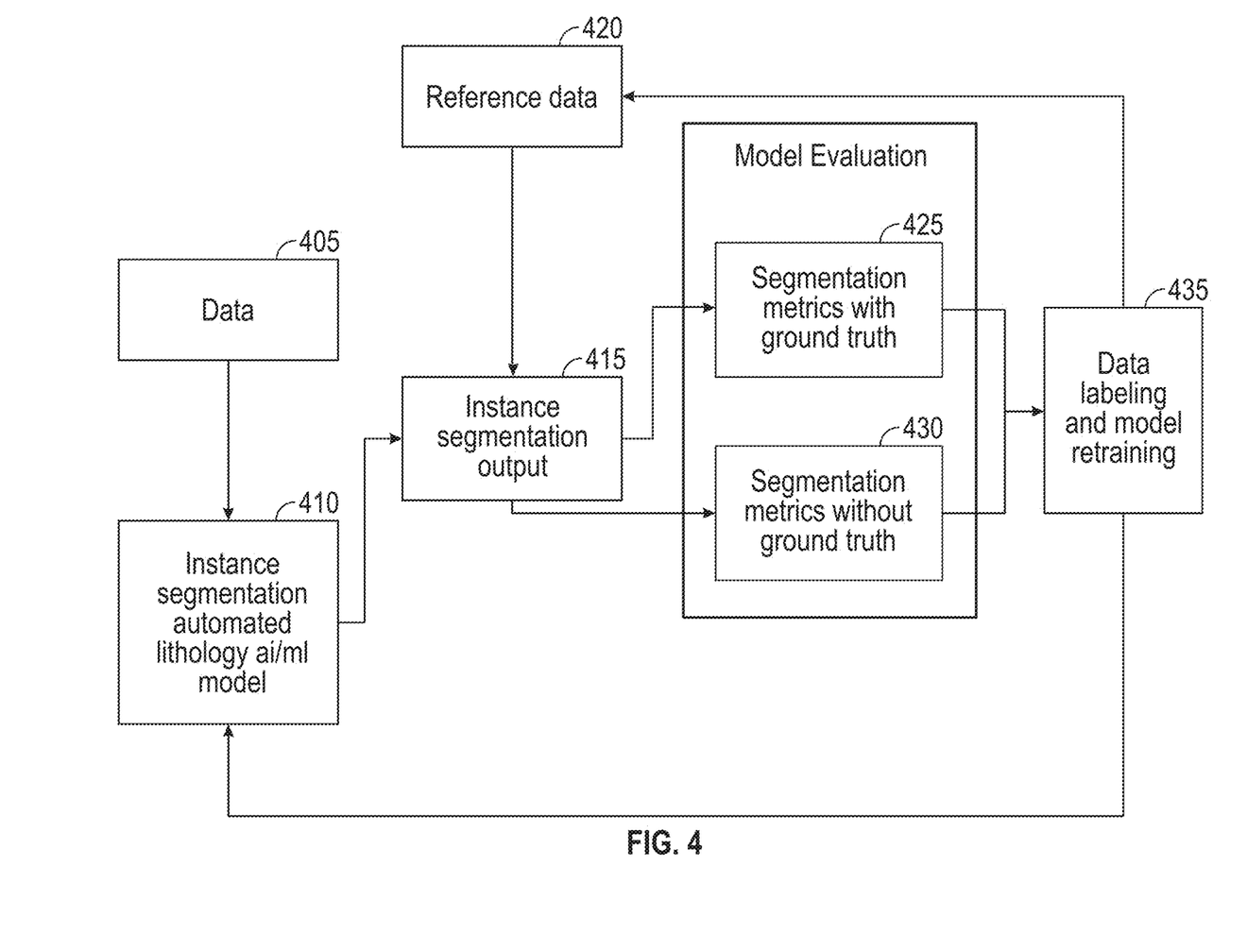
FIG. 4 depicts an example workflow for monitoring, evaluating, and updating instance segmentation automated lithology AI/ML models, according to one or more aspects.

According to certain aspects, the EDA may be used to improve the training dataset, after which the workflow 400 may return to the operation 315 to retrain the instance segmentation automated lithology AI/ML model using the improved training dataset.

FIG. 4 depicts an example workflow 400 for monitoring, evaluating, and updating instance segmentation automated lithology AI/ML models, according to one or more aspects.

As shown, new data 405 may input to an instance segmentation automated lithology AI/ML model 410. For example, the new data 405 may include images of drilling cuttings (e.g., as shown in the example depicted in FIG. 2A) obtained from a well. In some aspects, the data 405 is pre-processed before the data 405 is input to the instance segmentation automated lithology AI/ML model 410.

The instance segmentation automated lithology AI/ML model 410 uses the data 405 to generate instance segmentation output 415. In some aspects, the instance segmentation output 415 includes predicted instance segmentation (e.g., as shown in the example depicted in FIG. 2B), which may include boxes, scores, masks, or other instance segmentation information depending on the type of instance segmentation.

According to certain aspects, instance segmentation output 415 can be used to monitor and evaluate the performance of the instance segmentation automated lithology AI/ML model 410.

In some aspects, the monitoring and evaluation of the instance segmentation automated lithology AI/ML model 410 involves determining metrics such as the accuracy, precision, recall, and/or IoU, of the instance segmentation automated lithology AI/ML model 410 based on the new data 405 with respect to reference data 420. The reference data is a validation set. In some aspects, the reference data is previously labeled data or data for which the performance of the instance segmentation automated lithology AI/ML model 410 is known. For example, the reference data 420 may be a labelled dataset that is separate from the training dataset.

In some aspects, the data 405 and reference data 420 are used to monitor model performance metrics based on comparison to ground truth information 425. The ground truth information may include accurate, pre-defined labels and annotations of lithology information. The ground truth may include pixel-level and/or object-level annotations and/or classifications that delineate boundaries of various lithology of the reference data. In some aspects, the ground truth is manually annotated by experts.

In the model evaluation, the reference data 420 may be used as input to the model to perform a task (e.g., instance segmentation) and the model provides its predictions (e.g., instance segmentation output). In some aspects, the performance metrics are COCO metrics for instance segmentation, such as Mean Average Precision (mAP) score that represents the precision and recall of the model across different IoU thresholds, an Average Precision (AP) score that represents the precision of the model at various levels of recall for a given IoU threshold or average across multiple thresholds, an IoU score that represents how well the predicted segmentation masks overlap with the ground truth masks, a Mean Average Recall (mAR) score that represents how many true segmentation instances are corrected predicated by the model across various levels of recall, a precision ratio of true positive predictions to the total number of predictions, and a recall ratio of true positive predications to the total number of instances in the ground truth.

In some aspects, the metrics can be visualized at an evaluation dashboard. In some aspects, precision-recall curves may be generated from the metrics. In some aspects, various scores, charts, graphs, curves, or other visualizations of the metrics may be generated and displayed at the evaluation dashboard.

In some aspects, the data 405 and reference data 420 are used to monitor model performance metrics without ground truth information 430. For example, ground truth may not be available. In some aspects, the metrics without ground truth information 430 may include total number of segmentation instances detected by the instance segmentation automated lithology AI/ML model 410. In some aspects, the metrics without ground truth information 430 may include segmentation instance coverage. For example, if the total number of segmentation instances is low or if the instance coverage is small, this may indicate that the instance segmentation automated lithology AI/ML model 410 has poor performance.

In some aspects, both the performance metrics with ground truth information 425 and the performance metrics without ground truth information 430 may be evaluated.

Figure 5:
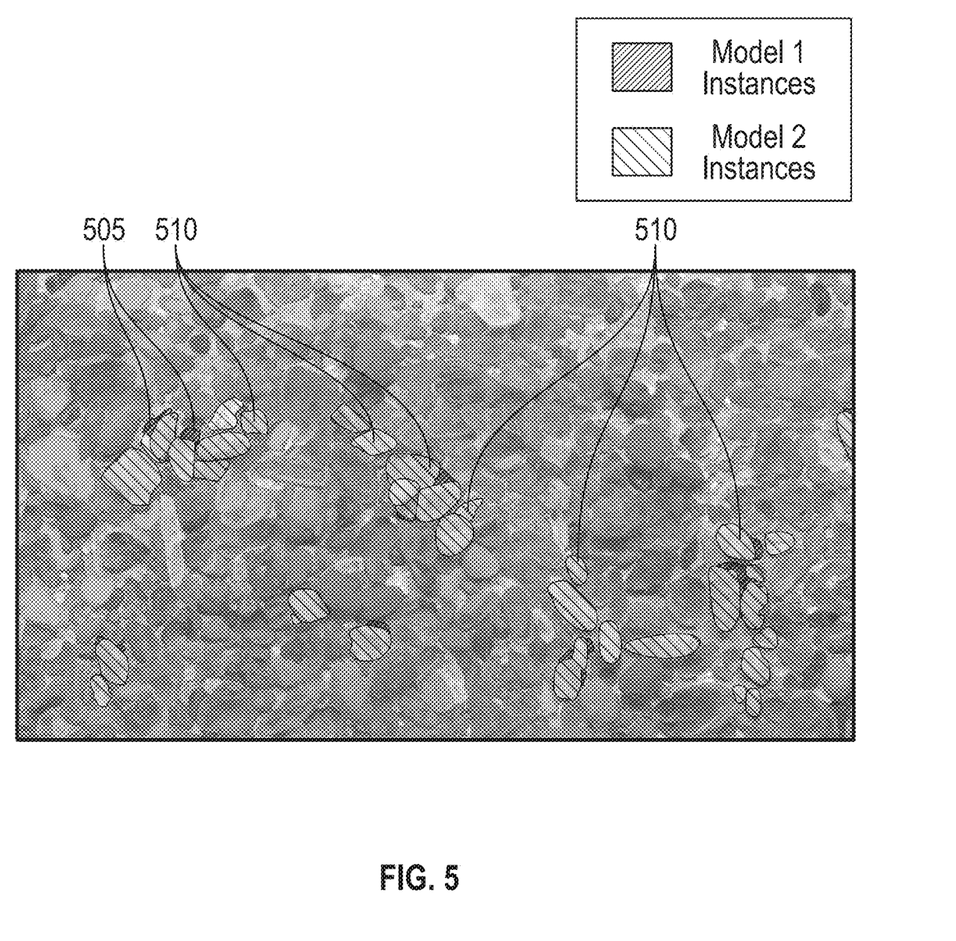
FIG. 5 depicts an example surface coverage comparison of two instance segmentation automated lithology AI/ML models, according to one or more aspects.

According to certain aspects, one or more thresholds can be set. The threshold(s) may represent a performance metrics threshold below which the instance segmentation automated lithology AI/ML model 410 may be retrained or replaced. In some aspects, the instance segmentation automated lithology AI/ML model 410 may be replaced based on a comparison of the metrics of another instance segmentation automated lithology AI/ML model. FIG. 5 depicts an example surface coverage comparison of two instance segmentation automated lithology AI/ML models, according to one or more aspects. As shown, the first instance segmentation automated lithology AI/ML model detects far fewer instances 505 than the segmentation instances 510 detected by the second instance segmentation automated lithology AI/ML model and the second instance segmentation automated lithology AI/ML model detects segmentation instances 510 with more surface coverage than the segmentation instances 505 detected by the first instance segmentation automated lithology AI/ML model. In this case, the first instance segmentation automated lithology AI/ML model may be replaced by the second instance segmentation automated lithology AI/ML model.

According to certain aspects, the metrics 425 and the metrics 430 fall below a threshold, a poor in comparison to metrics of another model, or are otherwise deemed unsatisfactory, then labeling and retraining 435 is performed. The new data 405 may be labeled and portion of the labeled new data may be added to the reference data 420 evaluation data and a portion of the newly labeled data may be added to the training dataset to retrain the instance segmentation automated lithology AI/ML model 410. In some aspects, the new data 405 is labeled by hand. In some aspects, a meta model may be used to help semi-automatically label the data. The retrained model may be evaluated and then deployed to replace the instance segmentation automated lithology AI/ML model 410.

In some aspects, the monitoring and evaluation of the instance segmentation automated lithology AI/ML model 410 is performed continuously in real-time, allowing for quick identification of performance drops to ensure reliability and consistency in the model performance, ultimately enhancing geological exploration efficiency.

Figure 6:
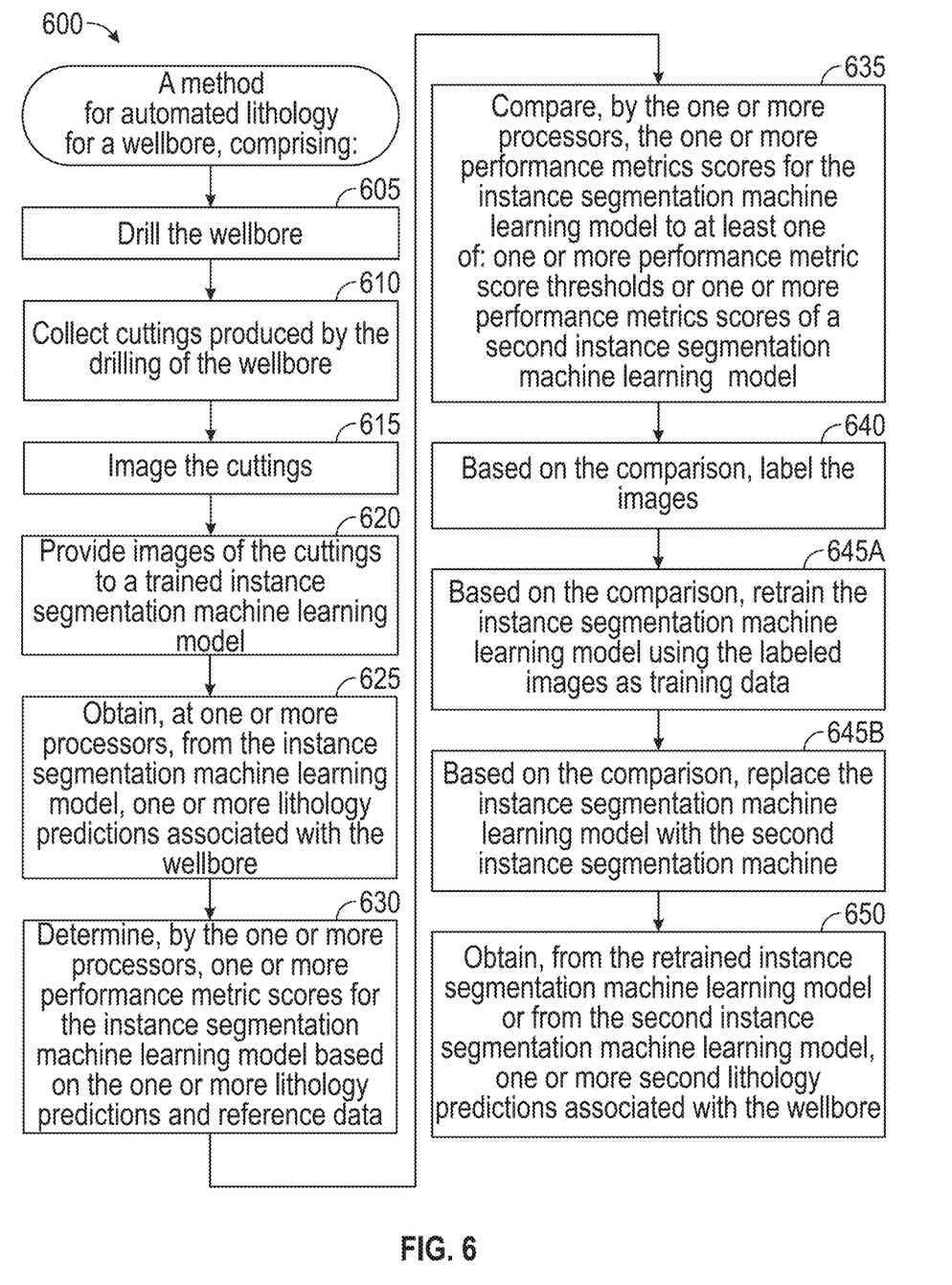
FIG. 6 depicts an example flow diagram of operations for monitoring, evaluating, and updating instance segmentation automated lithology AI/ML models, according to one or more aspects.

Example Method for Monitoring, Evaluating, and Updating Instance Segmentation Automated Lithology AI/ML Models FIG. 6 is a flow diagram illustrating operations 600 for monitoring, evaluating, and updating instance segmentation automated lithology AI/ML models, according to one or more aspects. The operations 600 may be understood with reference to the FIGS. 1-5. The operations 600 may be performed by a system for monitoring, evaluating, and updating instance segmentation automated lithology AI/ML models (e.g., such as the instance segmentation automated lithology AI/ML model monitoring, evaluating, and updating system 700).

In some aspects, the operations 600 are performed continuously in-real time during drilling of the wellbore.

Operations 600 may begin, at operation 605, with drilling the wellbore (e.g., such as the wellbore 26 depicted in FIG. 1).

Operations 600 may include, at operation 610, collecting cuttings produced by the drilling of the wellbore.

Operations 600 may include, at operation 615 imaging the cuttings (e.g., as depicted in FIG. 2A).

Operations 600 may include, at operation 620, providing images of the cuttings to a trained instance segmentation machine learning model (e.g., such as the instance segmentation automated lithology AI/ML model 410 depicted in FIG. 4).

Operations 600 may include, at operation 625, obtaining, at one or more processors, from the instance segmentation machine learning model, one or more lithology predictions associated with the wellbore (e.g., as depicted in FIG. 2B or FIG. 5). In some aspects, the one or more lithology predictions comprise at least one of: boxes, scores, masks, or annotations associated with segments in the one or more lithology predictions.

Operations 600 may include, at operation 630, determining, by the one or more processors, one or more performance metric scores for the instance segmentation machine learning model based on the one or more lithology predictions and reference data. In some aspects, determining, by the one or more processors, the one or more performance metric scores for the instance segmentation machine learning model comprises determining at least one performance metric score without ground truth information. In some aspects, determining the at least one performance metric score without ground truth information comprises determining the at least one performance metric score based on a total number of detected segments in the one or more lithology predictions. In some aspects, determining the at least one performance metric score without ground truth information comprises determining the at least one performance metric score based on a surface coverage associated with segments in the one or more lithology predictions. In some aspects, determining, by the one or more processors, the one or more performance metric scores for the instance segmentation machine learning model further comprises determining at least one performance metric score with ground truth information based on a comparison of the one or more lithology predictions to the ground truth information. In some aspects, determining the at least one performance metric score without ground truth information comprises determining at least one of: a precision score, or a recall score, of the instance segmentation machine learning model.

Operations 600 may include, at operation 635, comparing, by the one or more processors, the one or more performance metrics scores for the instance segmentation machine learning model to at least one of: one or more performance metric score thresholds or one or more performance metrics scores of a second instance segmentation machine learning model.

Operations 600 may include, at operation 640, based on the comparison, labeling the images.

Operations 600 may include, at operation 645A, (i) retraining the instance segmentation machine learning model using the labeled images as training data. Or operations 600 may include, at operation 645B, (ii) replacing the instance segmentation machine learning model with the second instance segmentation machine learning model.

In some aspects, labeling the images and retraining the instance segmentation machine learning model using the labeled images as training data based on the comparison is in response to the one or more performance metric scores being below one or more threshold performance metric scores.

In some aspects, labeling the images and replacing the instance segmentation machine learning model with the second instance segmentation machine learning model based on the comparison is in response to the one or more performance metric scores being below the one or more performance metric scores of the second instance segmentation machine learning model.

In some aspects, operations 600 further include using the labeled images as reference data.

Operations 600 may include, at operation 650, obtaining, from the retrained instance segmentation machine learning model or from the second instance segmentation machine learning model, one or more second lithology predictions associated with the wellbore.

In some aspects, operations 600 may further include displaying a visualization of the one or more performance metric scores on a display.

In some aspects, operations 600 may further include adjusting one or more drilling parameters for drilling the wellbore in response to the one or more second lithology predictions.

In some aspects, operations 600 may further include at least one of: adjusting a weight-on-bit value, adjusting a bit type, or adjusting a drilling rate based on the one or more second lithology predictions.

Figure 7:
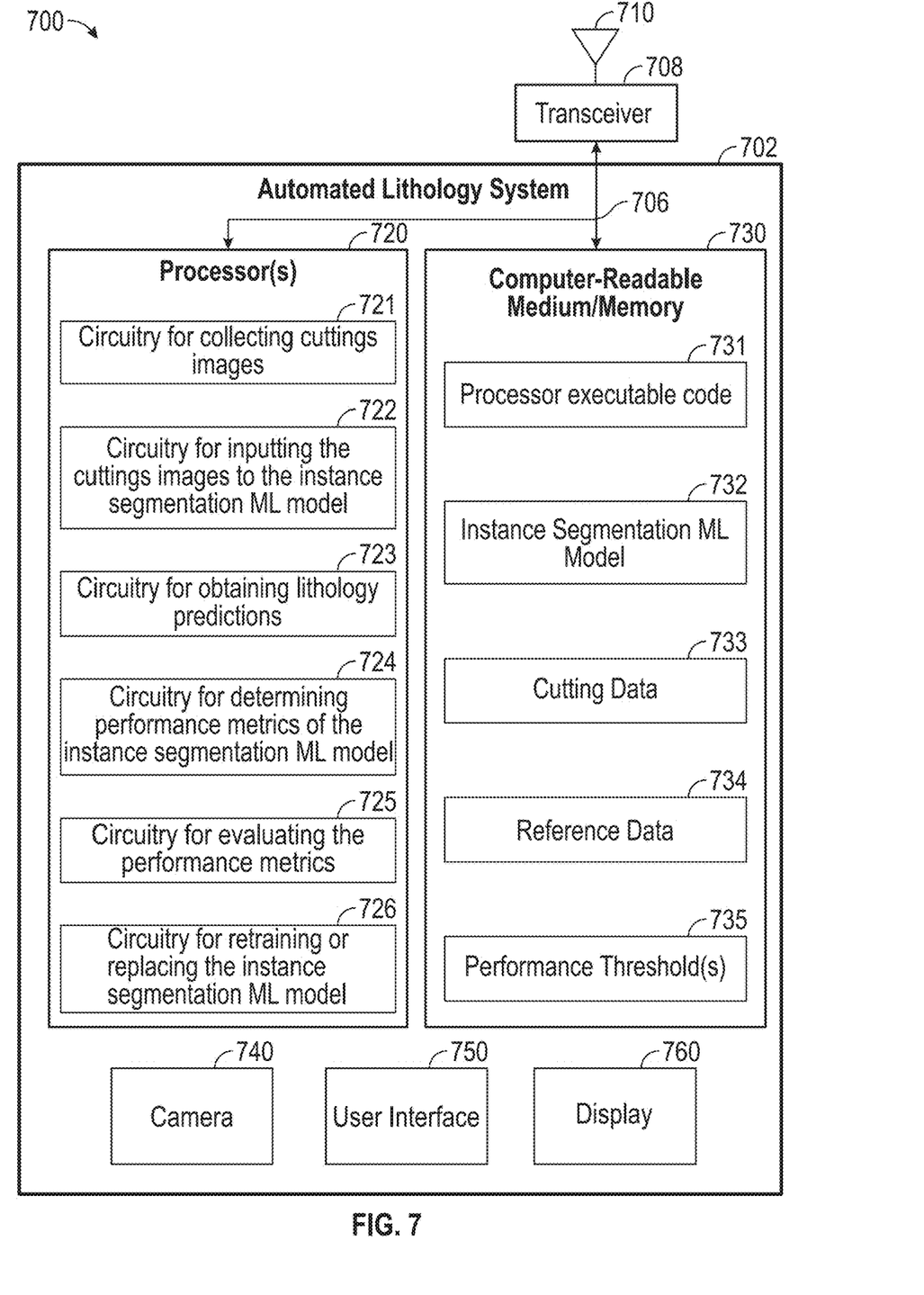
FIG. 7 depicts an example system for monitoring, evaluating, and updating instance segmentation automated lithology AI/ML models, according to one or more aspects.

Example System for Monitoring, Evaluating, and Updating Instance Segmentation Automated Lithology AI/ML Models FIG. 7 depicts aspects of an example automated lithology system 700. Automated lithology automated lithology system 700 may be implemented as a single device or, in some aspects, components of automated lithology system 700 may be implemented across multiple physical devices. In some aspects, the components of automated lithology system 700 may be located at the wellbore, remotely from the wellbore, and/or distributed across locations at the wellbore and remote locations.

The automated lithology system 700 includes a processing system 702, which may be coupled to a transceiver 708 (e.g., a transmitter and/or a receiver). The transceiver 108 may be configured to transmit and receive signals for the automated lithology system 700 wirelessly via an antenna 710 or over a wired connection. The transceiver may be used for inter-communication between components within the automated lithology system 700 and/or for communication with other devices or systems over a network.

The processing system 702 includes one or more processors 720. The one or more processors 720 may be coupled to a computer-readable medium/memory 730 via a bus 706 or may communicate with the computer-readable medium/memory 730 via a wired or wireless connection over a network. In certain aspects, the computer-readable medium/memory 730 is configured to store instructions (e.g., computer-executable code) that when executed by the one or more processors 720, cause the one or more processors 720 to perform the operations 600 described with respect to FIG.

6, or any aspect related to it. Note that reference to a processor performing a function of system 700 may include one or more processors performing that function of system 700.

The one or more processors 720 include circuitry configured to implement (e.g., execute) the aspects described herein for automated lithology instance segmentation machine learning model monitoring, evaluation, and update, including circuitry for collecting cuttings images 721, circuitry for inputting the cuttings images to the instance segmentation ML model 722, circuitry for obtaining lithology predictions 723, circuitry for determining performance metrics of the instance segmentation ML model 724, circuitry for evaluating the performance metrics 725, and circuitry for retraining or replacing the instance segmentation ML model 726. Processing with circuitry 721-726 may cause the automated lithology system 700 to perform the operations 600 described with respect to FIG. 6 or any aspect related to it.

In the depicted example, computer-readable medium/memory 730 stores code (e.g., executable instructions). Processing of the code may cause the automated lithology system 700 to perform the operations 600 described with respect to FIG. 6, or any aspect related to it. In addition, computer-readable medium/memory 730 may store information that can be used by the processors 720. For example, computer-readable medium/memory 730 may store processor executable code 731 that may be executable by the one or more processors 720 to perform the operations 600 described with respect to FIG. 6. The computer-readable medium/memory 730 may store an instance segmentation ML model 732, cutting data 733, reference data 734, and performance thresholds 735.

In addition, the automated lithology system 700 may include a camera 740 for imaging cuttings obtained from a wellbore.

The automated lithology system 700 may include a user interface 750 to accept inputs from a user. In some aspects, the user interface 750 is a graphical user interface (GUI). In some aspects, the GUI accepts touch screen inputs from the user. In some aspects, the user interface 750 includes one or more input/output (IOs) interfaces that allows one or more I/O devices (e.g., keyboards, displays, mouse devices, pen inputs, microphones, etc.) to connect to the automated lithology system 700. The inputs from the user may include decisions on the retraining or replacing the instance segmentation automated lithology machine learning, and/or parameters for the retraining or replacing. The inputs from the user may include drilling decisions or selections, such as adjusted drilling parameters.

The automated lithology system 700 may include a display 760 configured to displaying visualizations of the model evaluations, the performance metrics scores, and/or other visualizations discussed herein.

Example Aspects

In addition to the various aspects described above, specific combinations of aspects are within the scope of the disclosure, some of which are detailed below:

Aspect 1: A method of automated lithology at a wellbore, comprising: drilling the wellbore; collecting cuttings produced by the drilling of the wellbore; imaging the cuttings; providing images of the cuttings to a trained instance segmentation machine learning model; obtaining, at one or more processors, from the instance segmentation machine learning model, one or more lithology predictions associated with the wellbore; determining, by the one or more processors, one or more performance metric scores for the instance segmentation machine learning model based on the one or more lithology predictions and reference data; comparing, by the one or more processors, the one or more performance metrics scores for the instance segmentation machine learning model to at least one of: one or more performance metric score thresholds or one or more performance metrics scores of a second instance segmentation machine learning model; based on the comparison: labeling the images; and (i) retraining the instance segmentation machine learning model using the labeled images as training data; or (ii) replacing the instance segmentation machine learning model with the second instance segmentation machine learning model; and obtaining, from the retrained instance segmentation machine learning model or from the second instance segmentation machine learning model, one or more second lithology predictions associated with the wellbore.

Aspect 2: The method of Aspect 1, wherein the one or more lithology predictions comprise at least one of: boxes, scores, masks, or annotations associated with segments in the one or more lithology predictions.

Aspect 3: The method of any combination of Aspects 1-2, wherein the determining, by the one or more processors, the one or more performance metric scores for the instance segmentation machine learning model comprises determining at least one performance metric score without ground truth information.

Aspect 4: The method of Aspect 3, wherein determining the at least one performance metric score without ground truth information comprises determining the at least one performance metric score based on a total number of detected segments in the one or more lithology predictions.

Aspect 5: The method of any combination of Aspects 3-4, wherein determining the at least one performance metric score without ground truth information comprises determining the at least one performance metric score based on a surface coverage associated with segments in the one or more lithology predictions.

Aspect 6: The method of any combination of Aspects 3-5, wherein determining, by the one or more processors, the one or more performance metric scores for the instance segmentation machine learning model further comprises determining at least one performance metric score with ground truth information based on a comparison of the one or more lithology predictions to the ground truth information.

Aspect 7: The method of Aspect 6, wherein determining the at least one performance metric score without ground truth information comprises determining at least one of: a precision score, or a recall score, of the instance segmentation machine learning model.

Aspect 8: The method of any combination of Aspects 1-7, further comprising displaying a visualization of the one or more performance metric scores on a display.

Aspect 9: The method of any combination of Aspects 1-8, wherein labeling the images and retraining the instance segmentation machine learning model using the labeled images as training data based on the comparison is in response to the one or more performance metric scores being below one or more threshold performance metric scores.

Aspect 10: The method of any combination of Aspects 1-9, wherein labeling the images and replacing the instance segmentation machine learning model with the second instance segmentation machine learning model based on the comparison is in response to the one or more performance metric scores being below the one or more performance metric scores of the second instance segmentation machine learning model.

Aspect 11: The method of any combination of Aspects 1-10, further comprising using the labeled images as reference data.

Aspect 12: The method of any combination of Aspects 1-11, wherein the method is performed continuously in-real time during drilling of the wellbore.

Aspect 13: The method of any combination of Aspects 1-12, further comprising adjusting one or more drilling parameters for drilling the wellbore in response to the one or more second lithology predictions.

Aspect 14: The method of any combination of Aspects 1-13, further comprising at least one of: adjusting a weight-on-bit value, adjusting a bit type, or adjusting a drilling rate based on the one or more second lithology predictions.

Aspect 15: An apparatus comprising means for performing a method in accordance with any of Aspects 1-14.

Aspect 16: A computer-readable medium comprising executable instructions that, when executed by one or more processors of an apparatus, cause the apparatus to perform a method in accordance with any of Aspects 1-14.

Aspect 17: A computer program product embodied on a computer-readable storage medium comprising code for performing a method in accordance with any of Aspects 1-14.

Aspect 18: An apparatus comprising: a memory comprising executable instructions and one or more processors configured to execute the executable instructions and cause the apparatus to perform a method in accordance with any of Aspects 1-14.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

I claim:

1. A method of automated lithology at a wellbore, comprising:
   drilling the wellbore;
   collecting cuttings produced by the drilling of the wellbore;
   imaging the cuttings;
   providing images of the cuttings to a trained instance segmentation machine learning model;
   obtaining, at one or more processors, from the instance segmentation machine learning model, one or more lithology predictions associated with the wellbore;

determining, by the one or more processors, one or more performance metric scores for the instance segmentation machine learning model based on the one or more lithology predictions and reference data;
comparing, by the one or more processors, the one or more performance metrics scores for the instance segmentation machine learning model to at least one of: one or more performance metric score thresholds or one or more performance metrics scores of a second instance segmentation machine learning model;
based on the comparison:
labeling the images; and
(i) retraining the instance segmentation machine learning model using the labeled images as training data; or
(ii) replacing the instance segmentation machine learning model with the second instance segmentation machine learning model; and
obtaining, from the retrained instance segmentation machine learning model or from the second instance segmentation machine learning model, one or more second lithology predictions associated with the wellbore.

2. The method of claim 1, wherein the one or more lithology predictions comprise at least one of: boxes, scores, masks, or annotations associated with segments in the one or more lithology predictions.

3. The method of claim 1, wherein the determining, by the one or more processors, the one or more performance metric scores for the instance segmentation machine learning model comprises determining at least one performance metric score without ground truth information.

4. The method of claim 3, wherein determining the at least one performance metric score without ground truth information comprises determining the at least one performance metric score based on a total number of detected segments in the one or more lithology predictions.

5. The method of claim 3, wherein determining the at least one performance metric score without ground truth information comprises determining the at least one performance metric score based on a surface coverage associated with segments in the one or more lithology predictions.

6. The method of claim 3, wherein determining, by the one or more processors, the one or more performance metric scores for the instance segmentation machine learning model further comprises determining at least one performance metric score with ground truth information based on a comparison of the one or more lithology predictions to the ground truth information.

7. The method of claim 6, wherein determining the at least one performance metric score without ground truth information comprises determining at least one of: a precision score, or a recall score, of the instance segmentation machine learning model.

8. The method of claim 1, further comprising displaying a visualization of the one or more performance metric scores on a display.

9. The method of claim 1, wherein labeling the images and retraining the instance segmentation machine learning model using the labeled images as training data based on the comparison is in response to the one or more performance metric scores being below one or more threshold performance metric scores.

10. The method of claim 1, wherein labeling the images and replacing the instance segmentation machine learning model with the second instance segmentation machine learning model based on the comparison is in response to the one or more performance metric scores being below the one or more performance metric scores of the second instance segmentation machine learning model.

11. The method of claim 1, further comprising using the labeled images as reference data.

12. The method of claim 1, wherein the method is performed continuously in-real time during drilling of the wellbore.

13. The method of claim 1, further comprising adjusting one or more drilling parameters for drilling the wellbore in response to the one or more second lithology predictions.

14. The method of claim 1, further comprising at least one of: adjusting a weight-on-bit value, adjusting a bit type, or adjusting a drilling rate based on the one or more second lithology predictions.

15. A non-transitory computer readable medium comprising computer executable code for automated lithology at a wellbore, the computer executable code comprising:
code for inputting images of drilling cuttings from a wellbore to a trained instance segmentation machine learning model;
code for obtaining outputting from the instance segmentation machine learning model, one or more lithology predictions associated with the wellbore;
code for determining one or more performance metric scores for the instance segmentation machine learning model based on the one or more lithology predictions and reference data;
code for comparing the one or more performance metrics scores for the instance segmentation machine learning model to at least one of: one or more performance metric score thresholds or one or more performance metrics scores of a second instance segmentation machine learning model;
code for, based on the comparison:
labeling the images; and
(i) retraining the instance segmentation machine learning model using the labeled images as training data; or
(ii) replacing the instance segmentation machine learning model with the second instance segmentation machine learning model; and
code for obtaining, from the retrained instance segmentation machine learning model or from the second instance segmentation machine learning model, one or more second lithology predictions associated with the wellbore.

16. The non-transitory computer readable medium of claim 15, wherein the one or more lithology predictions comprise at least one of: boxes, scores, masks, or annotations associated with segments in the one or more lithology predictions.

17. The non-transitory computer readable medium of claim 15, wherein the code for determining the one or more performance metric scores for the instance segmentation machine learning model comprises code for determining at least one performance metric score without ground truth information.

18. The non-transitory computer readable medium of claim 17, wherein the code for determining the at least one performance metric score without ground truth information comprises code for determining the at least one performance metric score based on a total number of detected segments in the one or more lithology predictions.

19. The non-transitory computer readable medium of claim 17, wherein the code for determining the at least one performance metric score without ground truth information comprises code for determining the at least one performance metric score based on a surface coverage associated with segments in the one or more lithology predictions.

20. A system of automated lithology at a wellbore, comprising:
    a camera configured to image cuttings collected during drilling of the wellbore;
    a trained instance segmentation machine learning model configured to:
        obtain the images of the cuttings; and
        output one or more lithology predictions associated with the wellbore based on the images; and
    one or more processors configured to:
        determine one or more performance metric scores for the instance segmentation machine learning model based on the one or more lithology predictions and reference data;
        compare the one or more performance metrics scores for the instance segmentation machine learning model to at least one of: one or more performance metric score thresholds or one or more performance metrics scores of a second instance segmentation machine learning model; and
    based on the comparison:
        label the images; and
        (i) retrain the instance segmentation machine learning model using the labeled images as training data; or
        (ii) replace the instance segmentation machine learning model with the second instance segmentation machine learning model; and
    obtain, from the retrained instance segmentation machine learning model or from the second instance segmentation machine learning model, one or more second lithology predictions associated with the wellbore.

* * * * *